United States Patent
Brus

(10) Patent No.: US 9,094,919 B2
(45) Date of Patent: Jul. 28, 2015

(54) METHODS AND DEVICES FOR POWER CONTROL

(75) Inventor: Linda Brus, Vällingby (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 158 days.

(21) Appl. No.: 13/988,048

(22) PCT Filed: Nov. 17, 2010

(86) PCT No.: PCT/SE2010/051266
§ 371 (c)(1),
(2), (4) Date: May 17, 2013

(87) PCT Pub. No.: WO2012/067556
PCT Pub. Date: May 24, 2012

(65) Prior Publication Data
US 2013/0237277 A1    Sep. 12, 2013

(51) Int. Cl.
*H04W 52/24* (2009.01)
*H04W 52/08* (2009.01)
*H04W 52/12* (2009.01)
*H04W 52/14* (2009.01)

(52) U.S. Cl.
CPC ............. *H04W 52/24* (2013.01); *H04W 52/08* (2013.01); *H04W 52/12* (2013.01); *H04W 52/146* (2013.01)

(58) Field of Classification Search
CPC ..... H04W 52/04; H04W 52/08; H04W 52/12; H04W 52/24; H04W 52/146
USPC .................... 455/69, 522; 370/318
See application file for complete search history.

(56) References Cited

U.S. PATENT DOCUMENTS

| 7,702,350 B2 * | 4/2010 | Oh et al. ................. 455/522 |
| 2004/0116142 A1 * | 6/2004 | Wang et al. ................. 455/522 |
| 2006/0003789 A1 | 1/2006 | Murata et al. |
| 2007/0072613 A1 | 3/2007 | Smolyar et al. |

FOREIGN PATENT DOCUMENTS

EP    1 248 388 A1    10/2002

OTHER PUBLICATIONS

International Search Report, PCT/SE2010/051266, Jul. 27, 2011.

* cited by examiner

*Primary Examiner* — Raymond Dean
(74) *Attorney, Agent, or Firm* — Myers Bigel Sibley & Sajovec, P.A.

(57) ABSTRACT

In methods and devices for use in a radio base station of a cellular radio system, where the radio base station is arranged to control the power transmitted in the uplink by a user equipment by transmitting power control commands in the downlink to the user equipment striving to keep the received uplink Signal-to-Interference Ratio, SIR, at a given SIR target, the power transmitted is controlled by transmitting transmit power control commands in the downlink striving to keep the received uplink SIR at a corrected SIR target. The corrected SIR target can be a SIR target supplemented by a corrective term.

12 Claims, 8 Drawing Sheets

METHODS AND DEVICES FOR POWER CONTROL

CROSS REFERENCE TO RELATED APPLICATION

This application is a 35 U.S.C. §371 national stage application of PCT International Application No. PCT/SE2010/051266, filed on 17 Nov. 2010, the disclosure and content of which is incorporated by reference herein in its entirety. The above-referenced PCT International Application was published in the English language as International Publication No. WO 2012/067556 A1 on 24 May 2012.

TECHNICAL FIELD

The present invention relates to methods and devices for controlling the transmit power in the uplink of a cellular radio system.

BACKGROUND

For cellular radio systems numerous solutions have over the years been suggested for power control in enhanced uplink (EUL). Recently, Signal to Interference Ratio (SIR) based methods have been questioned with the argument that power control aiming for a constant received power gives a calmer and more stable system behavior. This has been of particular interest for Time Division (TD) scheduling because a future power control solution is likely to need to work in combination with a TD scheduler.

Conventional power control schemes are often SIR based, which dates back to Wideband Code Division Multiple Access (WCDMA) release 99 where no user was a dominating source of interference. Since a large number of users contributed to the total interference, the change in SIR of an individual user did not change the interference enough for it to have any significant effect on the SIR of the other users. The inner loop power control typically aims at retaining a target SIR, which in turn is set by the much slower outer loop power controller. However, a SIR based power control scheme has the advantage that it guarantees a certain signal quality for each user. Inner loop power control can be defined as the ability of the UE transmitter to adjust its output power in accordance with one or more Transmit Power Control (TPC) commands received in the downlink, striving to keep the received uplink Signal-to-Interference Ratio (SIR) at a given SIR target.

One alternative to SIR based power control is to try to retain constant received signal code power (RSCP) on Dedicated Physical Control Channel (DPCCH). Again this is typically obtained by comparing a target, in this case the target RSCP, to the measured equivalent, and then request that a User Equipment (UE) adjusts its transmitted power up or down. The main advantage of this method is that as the Enhanced Uplink (EUL) scheduler gives grants it effectively determines the amount of received power (at the radio base station Node B) each UE is allowed to generate. By using RSCP based power control one can be sure that the UE will not violate the power budget and power peaks will not be induced by the power controller.

A problem with some existing SIR based power control methods is that all users are linked to each other and that this is not taken into account in the inner loop power control. The users may then repeatedly trigger each other to increase the power levels, leading to power peaks and long settling times. In addition, there is typically more than one set of powers to achieve a specific set of SIRs for the users. The consequence of a power peak can then be that all users end up transmitting with higher power than necessary, generating extra interference inside and outside the cell where the users are located.

For power based control methods, a problem is that there is no way to guarantee the signal quality. Where SIR based power control increases the power to compensate for deteriorating signal quality as the interference increases, the power based control compensates for fading but has no way to compensate for changing interference. The result will then be an increased number of block errors until the interference subsides or the RSCP target is adjusted via the much slower outer loop control.

Hence there exist a need for new methods and devices providing improved performance for control in the inner loop of a cellular radio system.

SUMMARY

It is an object of the present invention to provide an improved methods and devices to address the problems as outlined above.

This object and others are obtained by the methods and devices as set out in the appended claims.

In accordance with embodiments described herein the target SIR used in the inner power control loop is supplemented in the radio base station with a correction term during the time from when a new grant is known until the new grant is in use. Hereby an improved inner power control loop can be achieved that uses the fast control of the inner loop and the power stability provided by the outer power control loop that sets the target SIR.

In accordance with one embodiment a method in a radio base station of a cellular radio system is provided. The radio base station is arranged to control the power transmitted in the uplink by a user equipment by transmitting power control commands in the downlink to the user equipment striving to keep the received uplink Signal-to-Interference Ratio, SIR, at a given SIR target. The power in the uplink is controlled by generating, during a grant delay, from when a new grant is known until a new grant is in use, a corrective Signal to Interference Ratio, SIR, target term, forming a corrected Signal to Interference Ratio, SIR, target by combining the Signal to Interference Ratio, SIR, target with the corrective Signal to Interference Ratio, SIR, target term, and controlling the power transmitted in the uplink by the UE power by transmitting transmit power control commands in the downlink striving to keep the received uplink Signal-to-Interference Ratio, SIR, at the corrected SIR target. Hereby the time from when a new grant is known until it is actually employed by the system can be utilized to set new power levels in the system before they are used. This in turn will reduce or avoid the problems associated with existing systems described above when power levels are changed in the system. For example oscillations and power rushes can be avoided.

In accordance with one embodiment the corrective Signal to Interference Ratio, SIR, target term is used during the whole grant delay.

In accordance with one embodiment the corrective term is set to ramp linearly from 0 to the difference between a SIR target before the new grant and a calculated new SIR target after the new grant.

In accordance with one embodiment, when a new grant(s) is known, steady state power levels are calculated that will generate Signal-to-Interference Ratio that is equal to a SIR target after the grant(s) have changed.

In accordance with one embodiment, the corrective term is set to a difference in power required to get SIR equal to the SIR target with the new and the old grant respectively.

The invention also extends to a radio base station, Node B, arranged to perform the methods as described above. The radio base station Node B can be provided with a controller/controller circuitry for performing the above methods. The controller(s) can be implemented using suitable hardware and or software. The hardware can comprise one or many processors that can be arranged to execute software stored in a readable storage media. The processor(s) can be implemented by a single dedicated processor, by a single shared processor, or by a plurality of individual processors, some of which may be shared or distributed. Moreover, a processor or may include, without limitation, digital signal processor (DSP) hardware, ASIC hardware, read only memory (ROM), random access memory (RAM), and/or other storage media.

The methods and devices as described herein can be used in many different cellular radio systems, such as WCDMA and Long Term Evolution (LTE) radio systems and also other radio systems in particular systems where the power of one user affects the transmission conditions for other users.

BRIEF DESCRIPTION OF THE DRAWINGS

The present invention will now be described in more detail by way of non-limiting examples and with reference to the accompanying drawing, in which.

DETAILED DESCRIPTION

Figure 1:
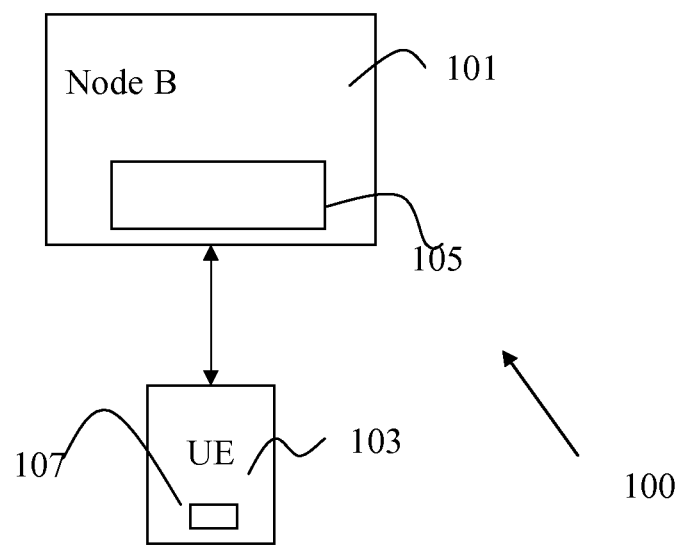
FIG. 1 is a view of a cellular radio system.

In FIG. 1 a general view of a cellular radio system 100 is depicted. The system 100 depicted in FIG. 1 is a UTRAN system. However it is also envisaged that the system can be an E-UTRAN system or another similar radio system. The system 100 comprises a number of base stations 101, whereof only one is shown for reasons of simplicity. The base station 101 can be connected to by user equipments in the figure represented by the UE 103 located in the area served by the base station 101. The system 100 is further configured to control the power transmitted in the uplink by a user equipment by transmitting power control commands striving to keep the received uplink Signal-to-Interference Ratio (SIR) at a given SIR target.

The base station and the user equipment further comprise controllers/controller circuitry 105 and 107 for providing functionality associated with the respective entities. The controllers 105 and 107 can for example comprise suitable hardware and or software. The hardware can comprise one or many processors that can be arranged to execute software stored in a readable storage media. The processor(s) can be implemented by a single dedicated processor, by a single shared processor, or by a plurality of individual processors, some of which may be shared or distributed. Moreover, a processor may include, without limitation, digital signal processor (DSP) hardware, ASIC hardware, read only memory (ROM), random access memory (RAM), and/or other storage media.

The controller in the radio base station can be set to control the power in the inner power control loop by aiming at following a Signal to Interference Ratio, SIR, target value, which can be set by an outer power control loop. The controller in the radio base station can further be arranged to generating a corrective Signal to Interference Ratio, SIR, target value term and to form a corrected Signal to Interference Ratio, SIR, target value by combining the Signal to Interference Ratio, SIR, target value with the Signal to Interference Ratio, SIR, target value term. The power control in the inner loop is then set to aiming at following the corrected signal to Interference Ratio, SIR, target value and the radio base station transmits power control commands to a user equipment striving to keep the received uplink Signal-to-Interference Ratio (SIR) at a given SIR target.

Figure 2:
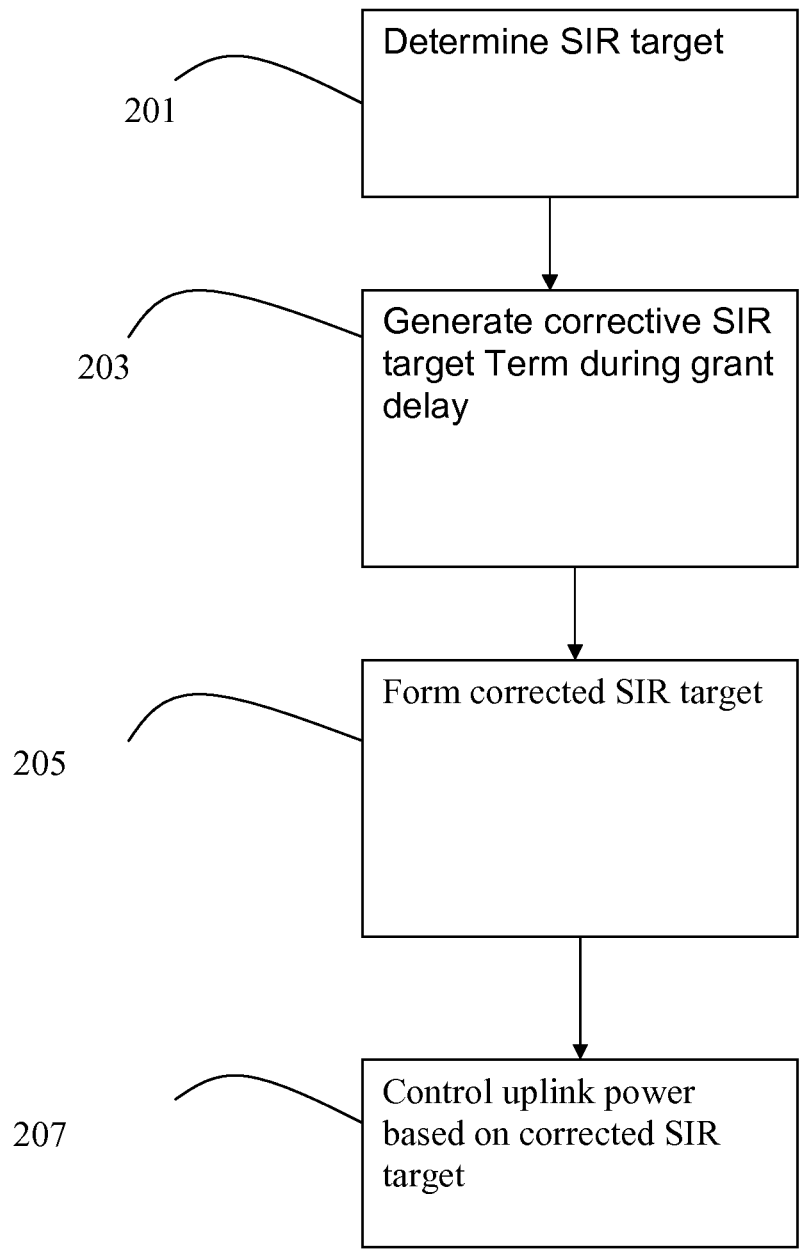
FIG. 2 is a flow chart depicting different steps performed when controlling the power in the inner loop, and FIGS. 3-8 illustrated different simulations.

This is further illustrated in FIG. 2. First, in a step 201, a Signal-to-Interference Ratio, SIR target is determined. The SIR target can typically be determined by an outer power control loop. Next, in a step 203, a corrective Signal to Interference Ratio, SIR, target term is generated during the grant delay, i.e. from when a new grant is known until the new grant is in use. Thereupon, in a step 205, a corrected Signal to Interference Ratio, SIR, target is formed by combining the Signal to Interference Ratio, SIR, target with the corrective Signal to Interference Ratio, SIR, target term. For example a delta value is calculated and added to/subtracted from the SIR target. Exemplary methods for generating a corrected Signal to Interference Ratio, SIR, target are described below. Then, in a step 207, the power transmitted in the uplink is controlled based on the corrected SIR target. This is achieved by controlling the UE transmit power by transmitting power control commands in the downlink striving to keep the received uplink Signal-to-Interference Ratio, SIR, at the corrected SIR target.

Using a control method comprising forming a corrected SIR target can obtain SIR based power control without inducing power peaks. In accordance with one embodiment this can be performed by utilizing the grant delay to calculate steady state power levels and then calculate corresponding adjustment terms for a SIR target to compensate for changing grants.

Further, in accordance with one embodiment calculations are performed for all users simultaneously.

Below some detailed examples are provided:

To calculate a correction term, $\Delta SIR_{target}$, consider the following model of the relation between grants, power, and SIR in a two user case:

$$1 + \gamma_i = 1 + \frac{\beta^2_{E\text{-}DPCCH,i} + \beta^2_{E\text{-}DPDCH,i}}{\beta^2_{DPCCH,i}} \quad (1)$$

$$N = \begin{pmatrix} \alpha(1+\gamma_1) & (1+\gamma_2) \\ (1+\gamma_1) & \alpha(1+\gamma_2) \end{pmatrix} p + \begin{pmatrix} N_0 \\ N_0 \end{pmatrix} = A(\gamma)p + b \quad (2)$$

$$SIR_i = \frac{p_i}{N_i} \quad (3)$$

$$S = \begin{pmatrix} SIR_1 & 0 \\ 0 & SIR_2 \end{pmatrix} \quad (4)$$

Here $(1+\gamma)$ denotes the grants (calculated from the $\beta$-factors used in WCDMA standard for describing power offsets for different channels such as DPDCH, E-DPCCH, E-DPDCH as compared to the DPCCH channel power), $\alpha$ is the orthogonality factor, i.e. the level of self interference, p is a power vector, $N_0$ is thermal noise, and N is interference. The subscript i corresponds to user i (cf. $\gamma_i$ for i=1,2 in equation (2)). Note that it is straight forward to extend the equations to cover cases with more than two users.

The above relation between grants, power and SIR makes it possible to use the knowledge that grants will be changed to calculate new "ideal" power levels.

In accordance with one embodiment the following steps can be performed when using the grant delay to form a corrected SIR target:

Calculate steady state power levels, p*, that will generate SIR=SIR$_{target}$ after the grants have changed to $\gamma^{new}$ by substituting (2) and (3) into (4) and solving for p:

$$p^* = (I - S_{target} \cdot A(\gamma^{new}))^{-1} S_{target} \cdot b \quad (5)$$

Calculate SIR levels, S*, that p* corresponds to with the current grant, i.e. before the grant change.

$$S^* = p^* (A(\gamma^{old}) p^* + b)^{-1} \quad (6)$$

Create a corrective SIR target term $\Delta SIR_{target}$ corresponding to the difference in power required to get SIR=SIR target with the new and the old grant respectively.

In order to achieve this, the SIR can be set to deviate from the outer loop set SIR target by a delta SIR target before the new grant comes into use. Hereby a controlled error in SIR before the grant change is used to avoid an uncontrolled error in SIR after the grant change. This in turn will avoid oscillations etc.

In accordance with one embodiment the corrective term can be set to ramp linearly from 0 to the difference between the SIR target before the new grant and the calculated new SIR target after the new grant ($SIR_i^* - SIR_{i,target}$) covering the time of the grant delay. Other ramps can of course also be used, such as successive up-stepping, non-linear ramps etc.

In the inner-loop power control the condition for sending up or down power control commands in the down link is changed to:

$$SIR < SIR_{target} + \Delta SIR_{target} \Rightarrow ILPC \text{ up}$$

$$SIR > SIR_{target} + \Delta SIR_{target} \Rightarrow ILPC \text{ down}$$

Thus, when the received SIR in the uplink is below the SIR target including the corrective term $\Delta SIR_{target}$ a TPC command ILPC up ordering the UE to increase the transmit power is transmitted in the down link to the UE. If, on the other hand, the received SIR in the uplink is above the SIR target including the corrective term $\Delta SIR_{target}$ a TPC command ILPC down ordering the UE to decrease the transmit power is transmitted in the down link to the UE. The typical behavior as compared to a conventional SIR based inner loop power controller is illustrated in FIG. 3.

Figure 3:
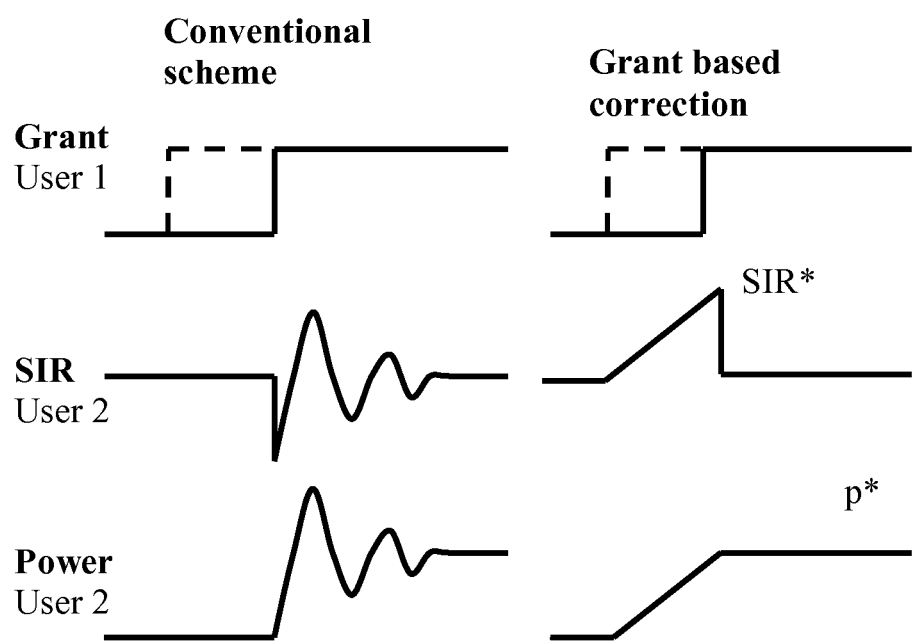

The left half of FIG. 3 illustrates the typical behavior of a conventional power control scheme, where no consideration is taken to the coupling of the users, and the grant delay is unutilized. When user 1 starts using a higher grant as illustrated by the solid line the SIR of user 2 will be impacted indirectly through an increased interference. To reestablish the original SIR user 2 has to increase its power. This leads to an offset in user 1's SIR leading to further adjustments and an oscillative behavior in power and SIR levels for all users. This scheme is inherently reactive and may potentially lead to higher power levels than necessary as the users trigger each other to increase the power in several steps in their attempts to reestablish the desired SIR.

Figure 4:
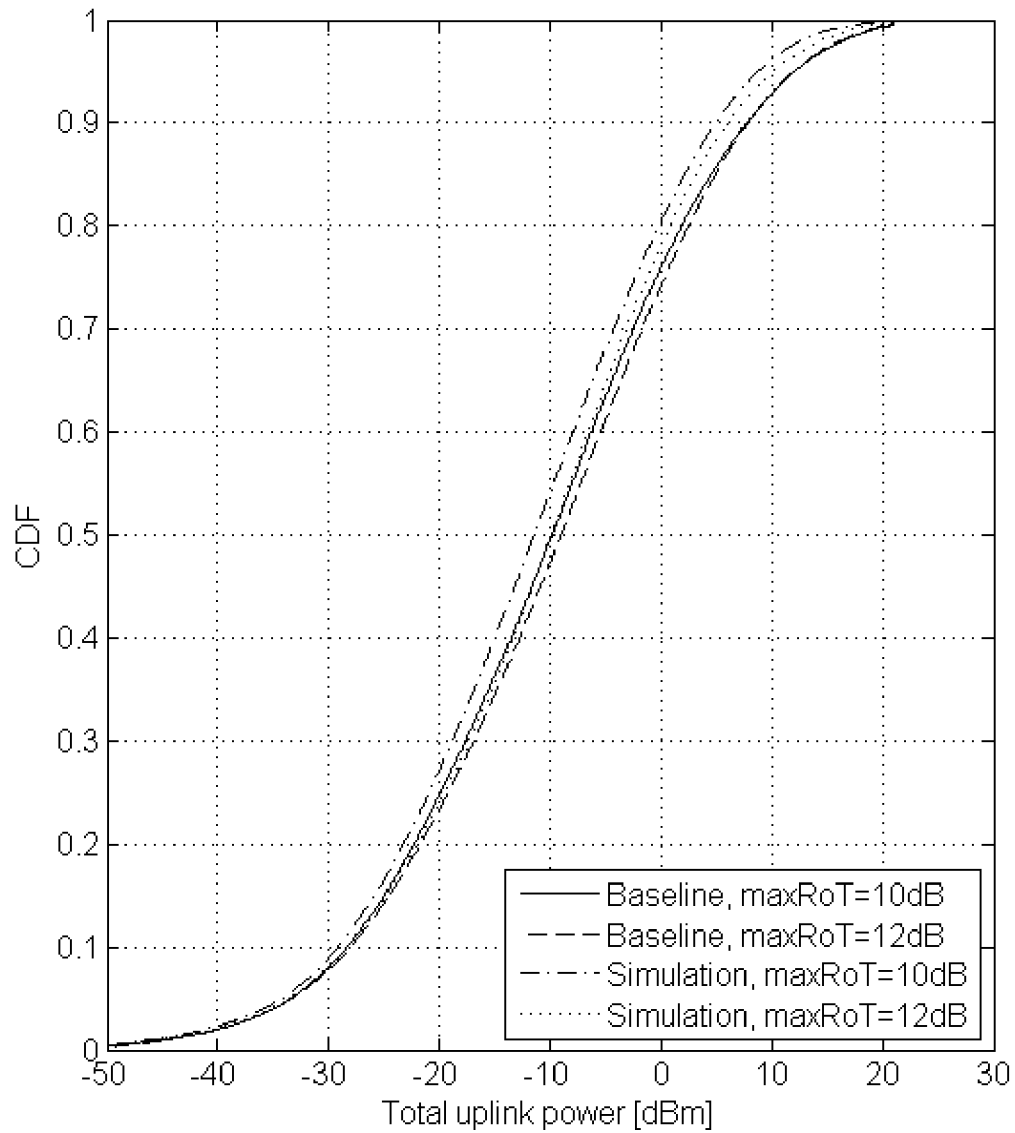
Figure 5:
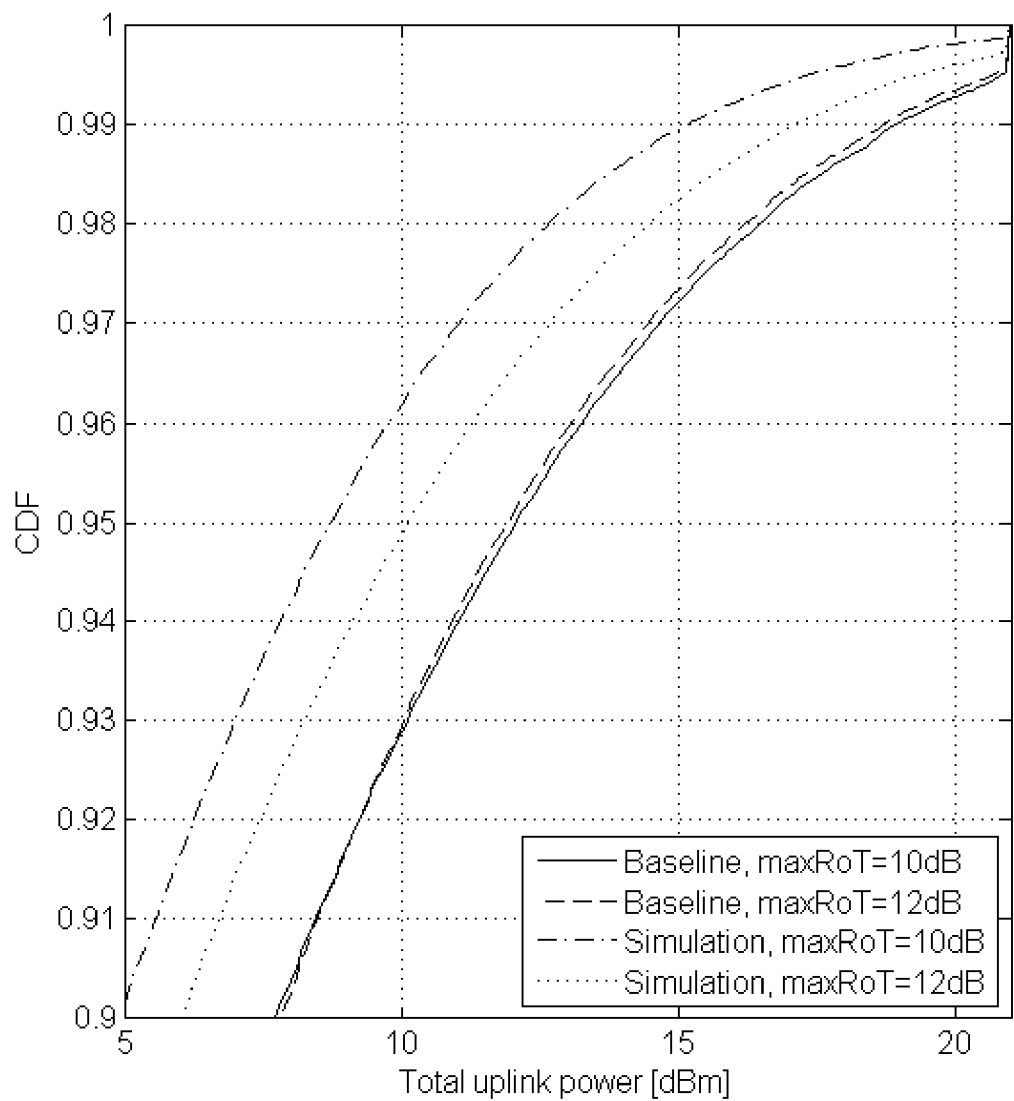

The right side of FIG. 3 shows the schematic behavior when a corrected SIR target is used. This method allows for predictive rather than reactive knowledge of the new grant levels as illustrated by the dashed line. The corrected SIR target that for example can be used during the whole or a part of the time from when a new grant is known until the new grant is used, can be used to prepare the power levels so that all users have a power level that corresponds to the SIR target that will be in use when the new grant is in use or close to this new SIR target Further system simulations show that it is possible to reduce the average power consumption in the uplink by approximately 1 dB compared to the baseline (conventional SIR based power control). This is illustrated in FIG. 4. For the 95$^{th}$ percentile the improvement is over 3 dB for one of the two cases studied as is illustrated in FIG. 5 indicating that substantial improvements in coverage can be obtained.

Figure 6:
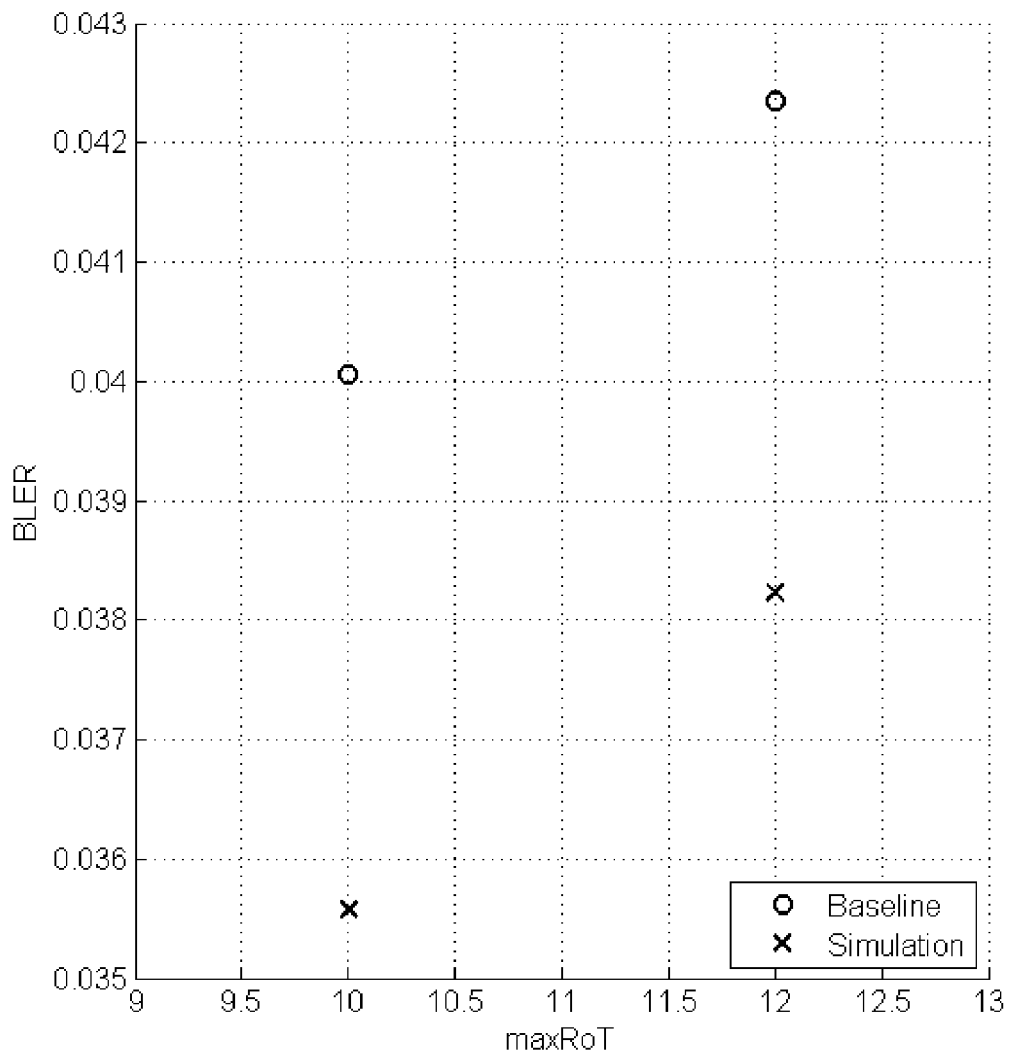
Figure 7:
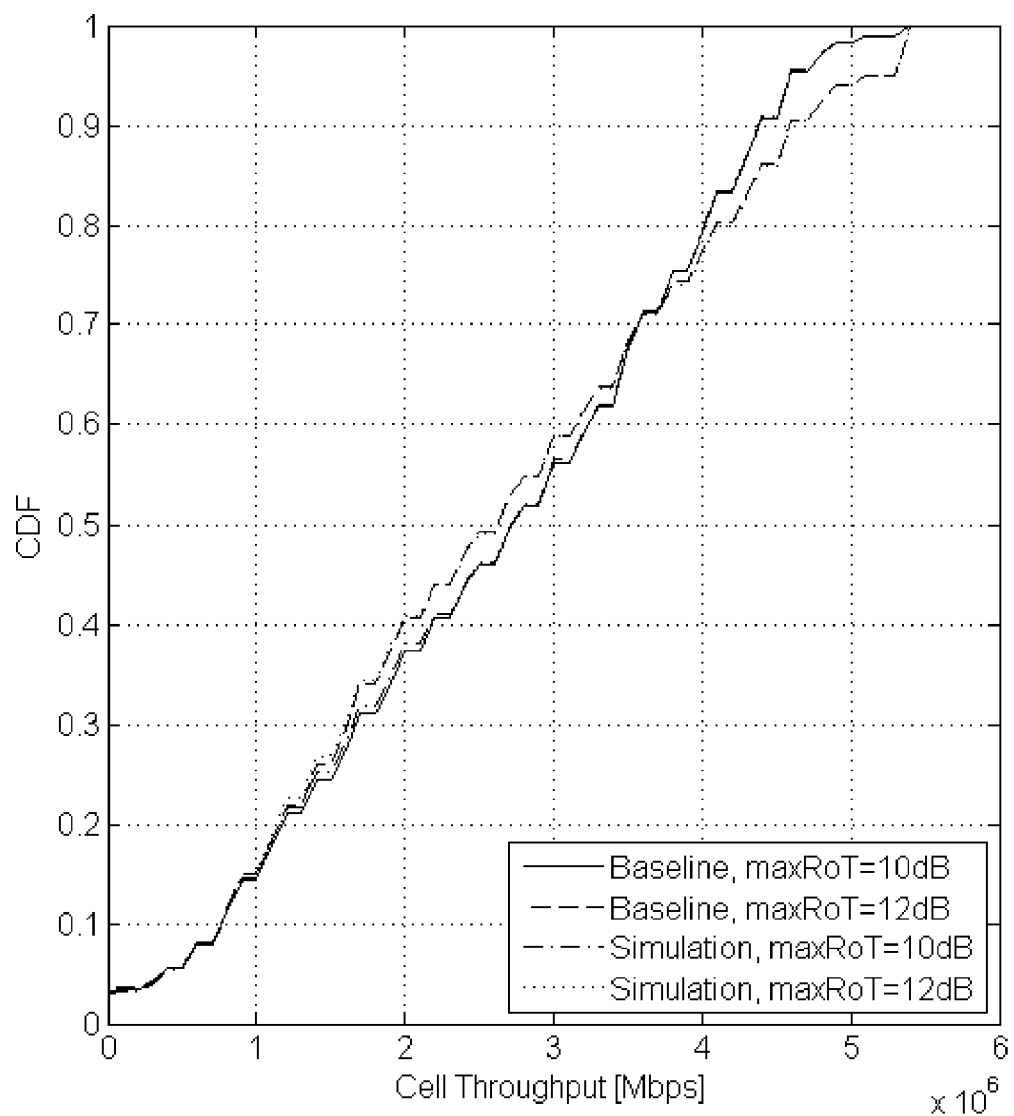
Figure 8:
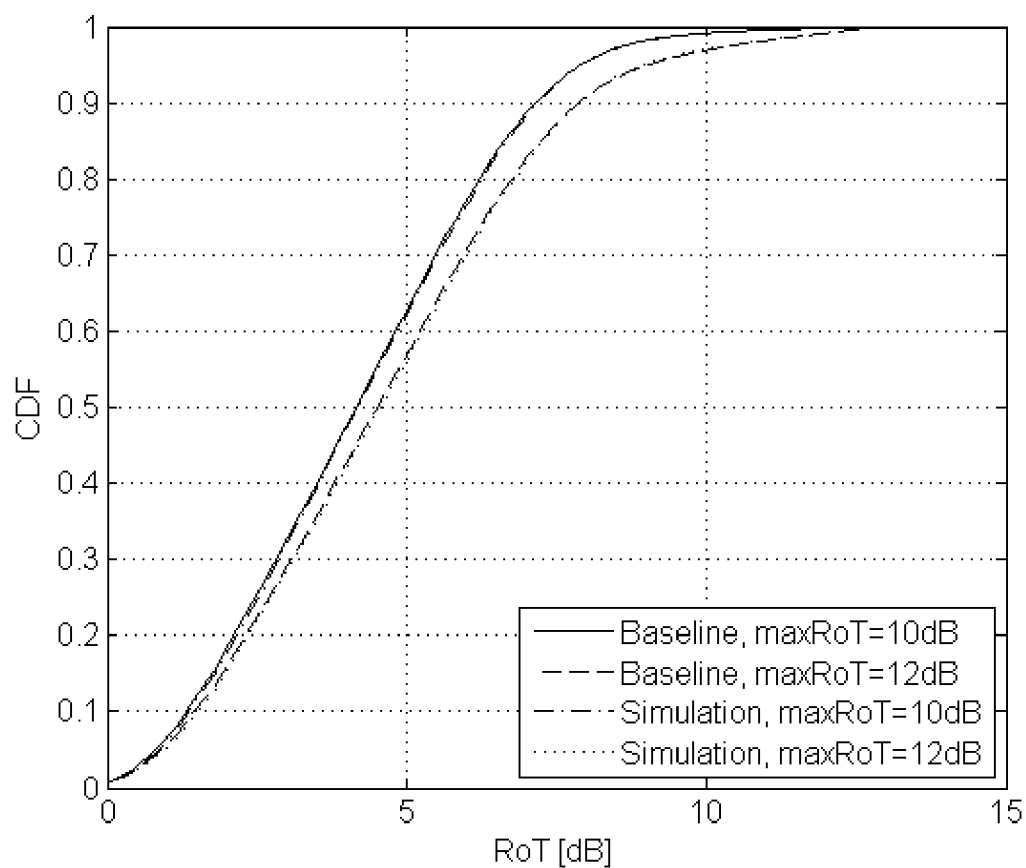

FIG. 6 shows that at the same time the block error rate is reduced by approximately 10%. In FIGS. 7 and 8 the cell throughput and rise over thermal for the test cases is illustrated. It can be seen here that the above improvements were produced while retaining a similar performance regarding throughput and noise rise.

It should also be noted that decreasing the Block error Rate (BLER) will typically increase the power consumption and/or decrease the throughput. Here both the BLER and the power consumption are reduced while the throughput remains unchanged. The improvement in BLER can easily be traded for improved throughput by allowing more retransmissions.

Using methods and devices as described herein can enable benefits such as a calm behavior with a limited risk of power peaks while retaining a certain signal quality for the users. Simulations show that embodiments significantly reduces the block error rate and the users consume less power as compared to the conventional SIR based power control method, while producing very similar throughput and noise rise. The reduced power consumption can be interpreted as better utilization of resources as the same throughput can be obtained using less power and improved coverage. Meanwhile the reduced BLER can be traded for improved throughput if the same number of retransmissions as for the conventional power control scheme would be used.

The invention claimed is:

1. A method in a radio base station of a cellular radio system, the radio base station being arranged to control the power transmitted in an uplink by a user equipment by transmitting power control commands in a downlink to the user equipment striving to keep the received uplink Signal-to-Interference Ratio, SIR, at a given SIR target, the method comprising:

generating during a grant delay for the user equipment, from when a new grant for the user equipment is known until the new grant is in use by the user equipment, a corrective SIR target term based on a power level associated with the new grant, forming a corrected SIR target by combining the given SIR target with the corrective SIR target term that is based on the power level associated with the new grant, and controlling the power transmitted in the uplink by the user equipment during the grant delay, from when the new grant for the user equipment is known until the new grant is in use by the user equipment, by transmitting transmit power control commands in the downlink during the grant delay, striving to keep the received uplink SIR at the corrected SIR target.

2. The method according to claim 1, wherein the corrective SIR target term is used during the whole grant delay.

3. The method according to claim 2, further comprising controlling the corrective SIR target term to ramp linearly during the grant delay from 0 to the difference between a SIR target before the new grant and a calculated new SIR target after the new grant.

4. The method according to claim 1, further comprising, when a new grant(s) is known, calculating steady state power levels that will generate Signal-to-Interference Ratio that is equal to a SIR target after the grant(s) have changed.

5. The method according to claim 4, further comprising controlling the corrective SIR target term to be a difference in power required to get SIR equal to the SIR target with the new and the old grant respectively.

6. A radio base station of a cellular radio system, the radio base station being arranged to control the power transmitted in an uplink by a user equipment by transmitting power control commands in a downlink to the user equipment striving to keep the received uplink Signal-to-Interference Ratio, SIR, at a given SIR target, the radio base station comprising:
   controller circuitry arranged to generate during a grant delay for the user equipment, from when a new grant for the user equipment is known until the new grant is in use by the user equipment, a corrective SIR target term based on a power level associated with the new grant,
   controller circuitry arranged to form a corrected SIR target by combining the given SIR target with the corrective SIR target term that is based on the power level associated with the new grant, and
   controller circuitry arranged to control the power transmitted in the uplink by the user equipment during the grant delay, from when the new grant for the user equipment is known until the new grant is in use by the user equipment, by transmitting transmit power control commands in the downlink during the grant delay, striving to keep the received uplink SIR at the corrected SIR target.

7. The radio base station according to claim 6, wherein the controller circuitry is arranged to use the corrective SIR target term during the whole grant delay.

8. The radio base station according to claim 7, wherein the controller circuitry is arranged to ramp the corrective term linearly during the grant delay from 0 to the difference between a SIR target before the new grant and a calculated new SIR target after the new grant.

9. The radio base station according to claim 6, wherein the controller circuitry is further arranged to, when a new grant(s) is known, calculate steady state power levels that will generate Signal-to-Interference Ratio that is equal to a SIR target after the grant(s) have changed.

10. The radio base station according to claim 9, wherein the controller circuitry is arranged to set the corrective SIR target term to a difference in power required to get SIR equal to the SIR target with the new and the old grant respectively.

11. The method according to claim 1, wherein the corrective SIR target term based on the power level associated with the new grant is also based on a power level associated with a grant, different from the new grant, to another user equipment.

12. The radio base station according to claim 6, wherein the corrective SIR target term based on the power level associated with the new grant is also based on a power level associated with a grant, different from the new grant, to another user equipment.

* * * * *